March 3, 1936.  M. MOSTKOFF  2,032,763
COFFEE CONTAINER
Filed Oct. 23, 1934
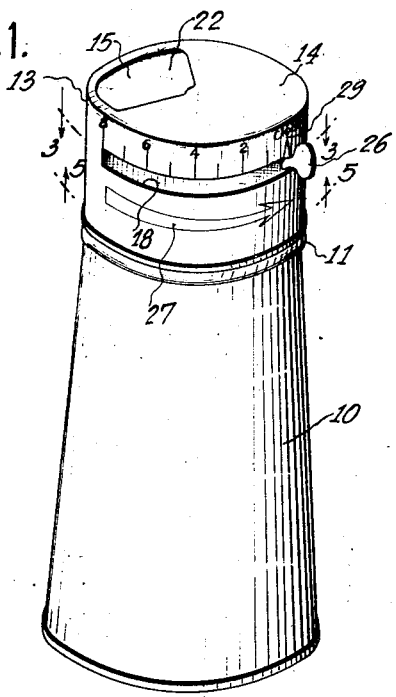
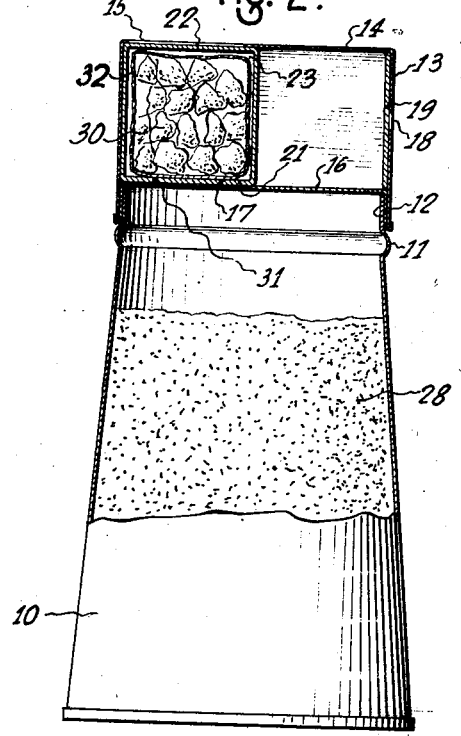
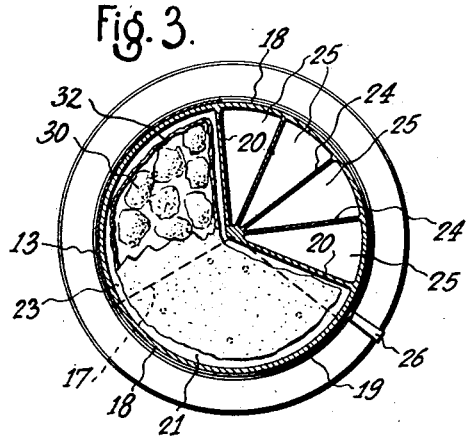
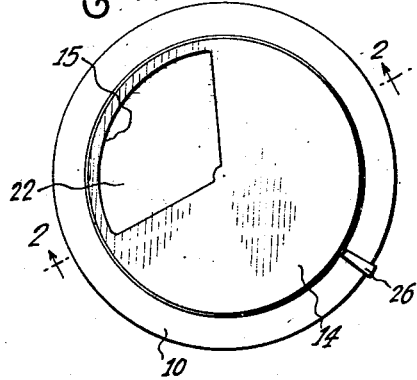
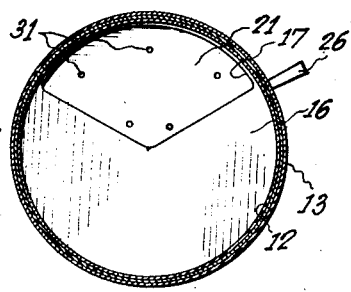
INVENTOR.
Morris Mostkoff.
BY F. Ledermann
ATTORNEY.

Patented Mar. 3, 1936

2,032,763

UNITED STATES PATENT OFFICE 2,032,763

COFFEE CONTAINER

Morris Mostkoff, New York, N. Y.

Application October 23, 1934, Serial No. 749,538

1 Claim. (Cl. 221—108)

The main object of this invention is the provision of a coffee container provided with means operable to permit any one of a plurality of measured quantities of coffee to be poured from the container, so that the proper quantity of ground coffee for any given number of cups to be prepared, is always assured with accuracy.

Another object of the invention is the provision of such a container with a rotatable member having graduations on the outside of the container by means of which the amount of coffee to be poured out of the can is regulated.

A still further object of the invention is the provision of means for absorbing oxygen from the air contained within the container, so that the coffee therein is preserved fresh.

The above and other objects will become apparent in the description below, in which characters of reference refer to like-named parts in the drawing.

Referring briefly to the drawing, Figure 1 is a perspective view of the container.

Figure 2 is a cross-sectional view taken on the line 2—2 of Figure 4.

Figure 3 is a cross-sectional view taken on the line 3—3 of Figure 1.

Figure 4 is a plan view of the container.

Figure 5 is a cross-sectional view taken on the line 5—5 of Figure 1.

Referring in detail to the drawing, the numeral 10 represents the base of the hollow container, and, as shown, this base tapers slightly upward. Near the top of the base 10 a peripheral bead 11 is provided. The mouth 12 projects above the bead 11.

A cap 13 fits about the mouth 12. The flat top of this cap, shown at 14, is provided with a radial cut-out portion equal in area to about one-third of the area of the top 14. A wall 16 is provided at a distance from, and parallel to, the top 14. This wall 16 is also provided with a cut-out area 17 equal in area to about one-third of the area of the wall 16. The two cut-outs 15 and 17, instead of being vertically in alignment, (that is, instead of the boundaries of the cut-out 17 being a vertical projection of the boundaries of the cut-out 15) are displaced one-third of a quadrant from each other, as shown in Figure 3. In the side wall of the cap 13, a peripheral slot 18 extends around two-thirds the periphery of the cap, that is, from a point directly below one radial side of the cut-out 15 to a point directly below the other radial side of the same.

A cylindrical wall 19 is rotatably mounted within the side walls of the cap and between the top 14 and the bottom wall 16. A top wall 22 and a bottom wall 21 are rigid with the upper and lower peripheries, respectively, of the wall 19. Radial partitions 20 divide the wall 19 into two sections, the first section comprising two-thirds of the area described by the wall 19, and the second section the remaining third. The two-thirds section is that enclosed by the two-thirds part of the wall 19, the top and bottom walls 22 and 21, and the partitions 20. In other words, this section enclosed as just mentioned, indicated by the numeral 23, comprises two-thirds of the volume of the cylindrical wall 19. The remaining third, between the partitions 20, is divided by additional partitions 24, into a number of equal volumes or compartments. These compartments, indicated by the numeral 25, are open at the top and bottom. A handle 26 projects from the wall 19 through the slot 18. The edge of the slot 18 is graduated to indicate the number of cups of coffee to be prepared. An arrow 27 is marked on the cap for the purpose presently to be described.

The hollow base 10 is filled with coffee 28. The handle 26 rests at the line 29 which reads "closed". If, now, it is desired to pour from the container the proper amount of ground coffee to prepare two cups, the handle 26 is moved to the left (Figure 1) to rest under the index number "2". Then the container is turned upside down. In this position, only one of the compartments 25 is open on its underside, so that coffee falls into this compartment and fills it. Then the handle 26 is moved in the opposite direction, that is, in the direction of the arrow 27, as far as it will go. In the latter position, all of the compartments 25 come within the cut-out 15 in the top wall of the cap 13, so that any coffee contained in any of the compartments 25 will fall out. The operation for four or more cups or any number from one to eight, is obvious. The container may of course also be designed for any number of cups in excess of eight. After pouring out the coffee, the handle 26 is again restored to the "closed" position.

Within the compartment 23, charcoal 30, or any other similarly acting substance, is placed, for the purpose of absorbing oxygen from the air within the container. The charcoal is contained in a porous paper bag or the like 32; in the bottom wall 21 of the compartment 23, one or more very small air vents 31 are provided through which the air has access to the compartment 23. When desired, the edge of the cap 13 may be turned down over the bead 11 to seal the container to prevent refilling.

Obviously, modifications in form and structure may be made without departing from the spirit of the invention.

I claim:

A device of the class described comprising a hollow container open at the top, a cap on said container having a top wall and a bottom wall, an opening in the top wall and an opening in the bottom wall of said cap, said openings being vertically spaced apart from each other, a cylindrical member rotatably mounted within said cap between said walls, said member having a plurality of compartments arranged side by side and open at both ends extending vertically therethrough, said member being rotatable to align one or more of said compartments progressively first with one of said cap openings and then with the other.

MORRIS MOSTKOFF.